United States Patent
Chen et al.

(10) Patent No.: US 8,660,736 B2
(45) Date of Patent: Feb. 25, 2014

(54) AUTONOMOUS MOBILE DEVICE AND METHOD FOR NAVIGATING THE SAME TO A BASE STATION

(75) Inventors: Tien-Chen Chen, New Taipei (TW); Kai-Sheng Lee, New Taipei (TW); Peng-Sheng Chen, New Taipei (TW)

(73) Assignee: Agait Technology Corporation, New Taipei (TW)

( * ) Notice: Subject to any disclaimer, the term of this patent is extended or adjusted under 35 U.S.C. 154(b) by 37 days.

(21) Appl. No.: 13/568,526

(22) Filed: Aug. 7, 2012

(65) Prior Publication Data

US 2013/0124031 A1    May 16, 2013

(30) Foreign Application Priority Data

Nov. 14, 2011   (TW) .............................. 100221445 U

(51) Int. Cl.
*G05D 1/00*        (2006.01)
(52) U.S. Cl.
USPC ............. 701/24; 700/300; 700/250; 700/262; 180/167; 180/258; 901/1; 901/46
(58) Field of Classification Search
USPC ........ 701/23, 24, 27, 300; 700/245, 250, 253, 700/262; 180/167, 258; 901/1, 46
See application file for complete search history.

(56) References Cited

U.S. PATENT DOCUMENTS

| | | | | |
|---|---|---|---|---|
| 5,610,815 | A * | 3/1997 | Gudat et al. ..................... | 701/23 |
| 5,680,313 | A * | 10/1997 | Whittaker et al. ............ | 701/300 |
| 6,532,404 | B2 * | 3/2003 | Colens .......................... | 700/262 |
| 7,483,714 | B2 * | 1/2009 | Tanaka et al. ................. | 455/522 |
| 8,368,339 | B2 * | 2/2013 | Jones et al. .................... | 318/567 |
| 8,380,350 | B2 * | 2/2013 | Ozick et al. ................... | 700/253 |
| 2007/0244610 | A1 * | 10/2007 | Ozick et al. ..................... | 701/23 |
| 2008/0091304 | A1 * | 4/2008 | Ozick et al. ................... | 700/258 |
| 2011/0004339 | A1 * | 1/2011 | Ozick et al. ................... | 700/245 |

OTHER PUBLICATIONS

Lamela et al, Sensor and Navigation System Integration for Autonomous Unmanned Aerial Vehicle Applications, Industrial Electronics Society, 25th Annual Conference of the IEEE, 1999, pp. 535-540.*

* cited by examiner

*Primary Examiner* — Russell Frejd
(74) *Attorney, Agent, or Firm* — SmithAmundsen LLC; Dennis S. Schell

(57) ABSTRACT

A method of navigating an autonomous mobile device to a base station is provided. In the method, when a detector detects a navigating signal sent out by the base station, the mobile device rotates in a first direction until the detector fails to detect the navigating signal, and a first time point is set at this time. Then, the mobile device rotates in a second direction opposite to the first direction until the detector fails to detect the navigating signal, and a second time point is set at this time. Afterward, the mobile device rotates in the first direction by a time computed based on the first and second time points to make the detector face the base station, and then, moves toward a direction pointed by the detector.

15 Claims, 7 Drawing Sheets

AUTONOMOUS MOBILE DEVICE AND METHOD FOR NAVIGATING THE SAME TO A BASE STATION

CROSS-REFERENCE TO RELATED APPLICATION

This application claims priority of Taiwanese Application No. 100221445, filed on Nov. 14, 2011.

BACKGROUND OF THE INVENTION

1. Field of the Invention

The present invention relates to a system including a base station and an autonomous mobile device capable of docking on the base station, more particularly to a system including a base station and an autonomous mobile device capable of being navigated to and docked on the base station.

2. Description of the Related Art

Generally, a conventional autonomous mobile device will return to a charging dock for recharging a battery when it completes a step of its task or when the battery thereof is running low. For example, an automated vacuum cleaning robot will return to a charging dock for recharging at the end of its operating cycle.

In order to navigate the conventional autonomous mobile device to the charging dock, the charging dock may send out a left-side navigating signal and a right-side navigating signal that cover respective navigating areas partly overlapping with each other. When a detector of the conventional autonomous mobile device detects one of the left-side and right-side navigating signals, the conventional autonomous mobile device will move to the overlapping area between the left-side and right-side navigating signals, and then, move within the overlapping area so as to return to the charging dock gradually. However, since a detection area of the single detector of the conventional autonomous mobile device is relatively limited, and since the overlapping area between the left-side and right-side navigating signals may be relatively large, it may be inefficient to navigate the conventional autonomous mobile device to the charging dock.

SUMMARY OF THE INVENTION

Therefore, an object of the present invention is to provide a method for efficiently navigating an autonomous mobile device to a base station.

Accordingly, a method of this invention for navigating an autonomous mobile device to a base station is provided. The base station sends out a main navigating signal, and the autonomous mobile device includes a movable case, a main detector disposed on the case, and a control unit for controlling movement of the case The method comprises the following steps of:

a) when the main detector detects the main navigating signal, configuring the control unit to rotate the case in a first direction until the main detector fails to detect the main navigating signal, and configuring the control unit to set a first time point when the main detector fails to detect the main navigating signal;

b) configuring the control unit to rotate the case in a second direction opposite to the first direction until the main detector fails to detect the main navigating signal, and configuring the control unit to set a second time point when the main detector fails to detect the main navigating signal;

c) configuring the control unit to compute a calibration time according to the first and second time points;

d) configuring the control unit to rotate the case in the first direction by the calibration time so as to make the main detector substantially point toward the base station; and e) configuring the control unit to move the case toward a direction pointed by the main detector.

According to another aspect, an autonomous mobile device of this invention is capable of docking on a base station that sends out a main navigating signal. The autonomous mobile device comprises a movable case, a main detector disposed on the case, and a control unit for controlling movement of the case. The control unit is operable to implement the above-mentioned method for navigating the autonomous mobile device to the base station.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
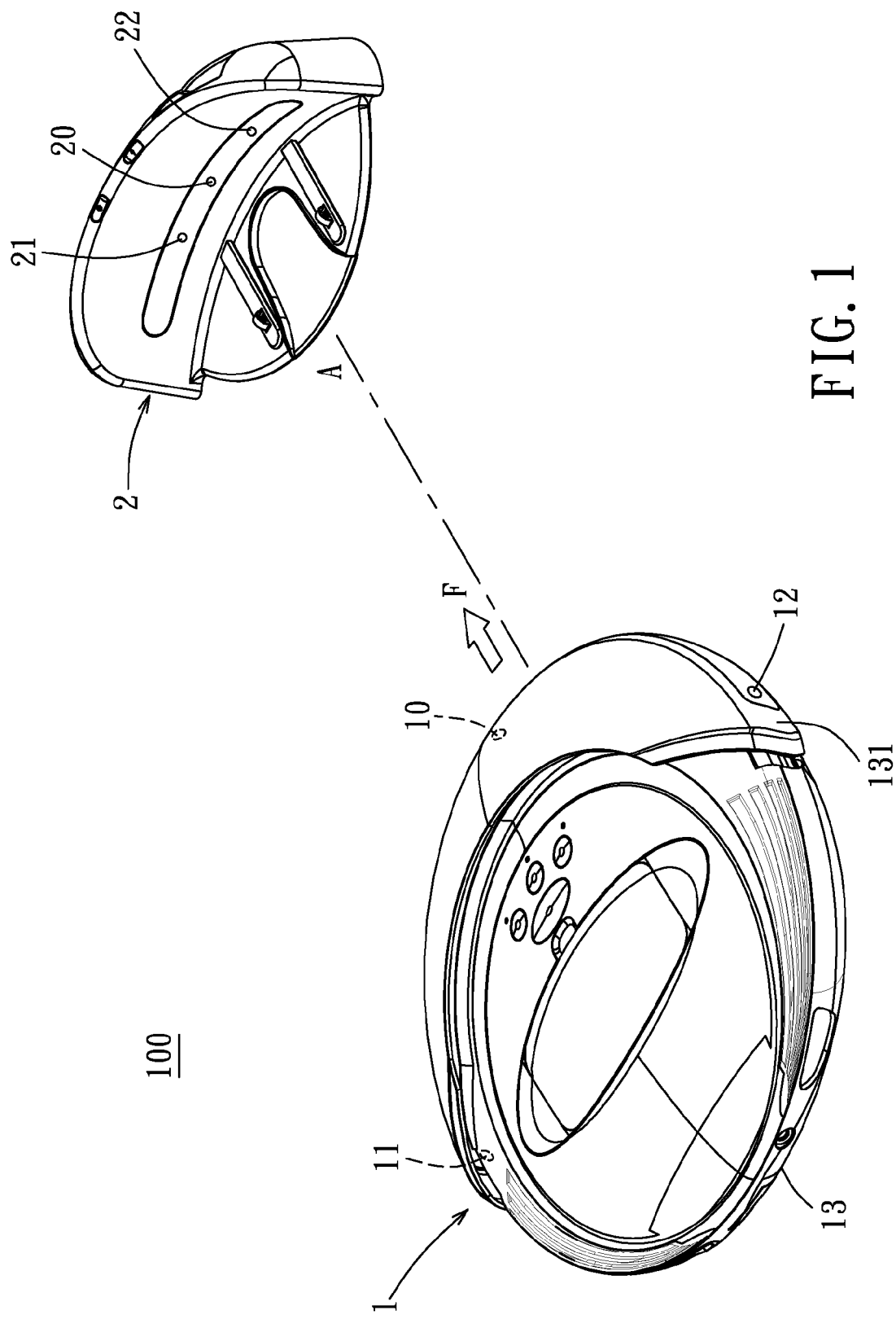
FIG. 1 is a perspective view of a preferred embodiment of a system including an autonomous mobile device and a base station of this invention.
Figure 2:
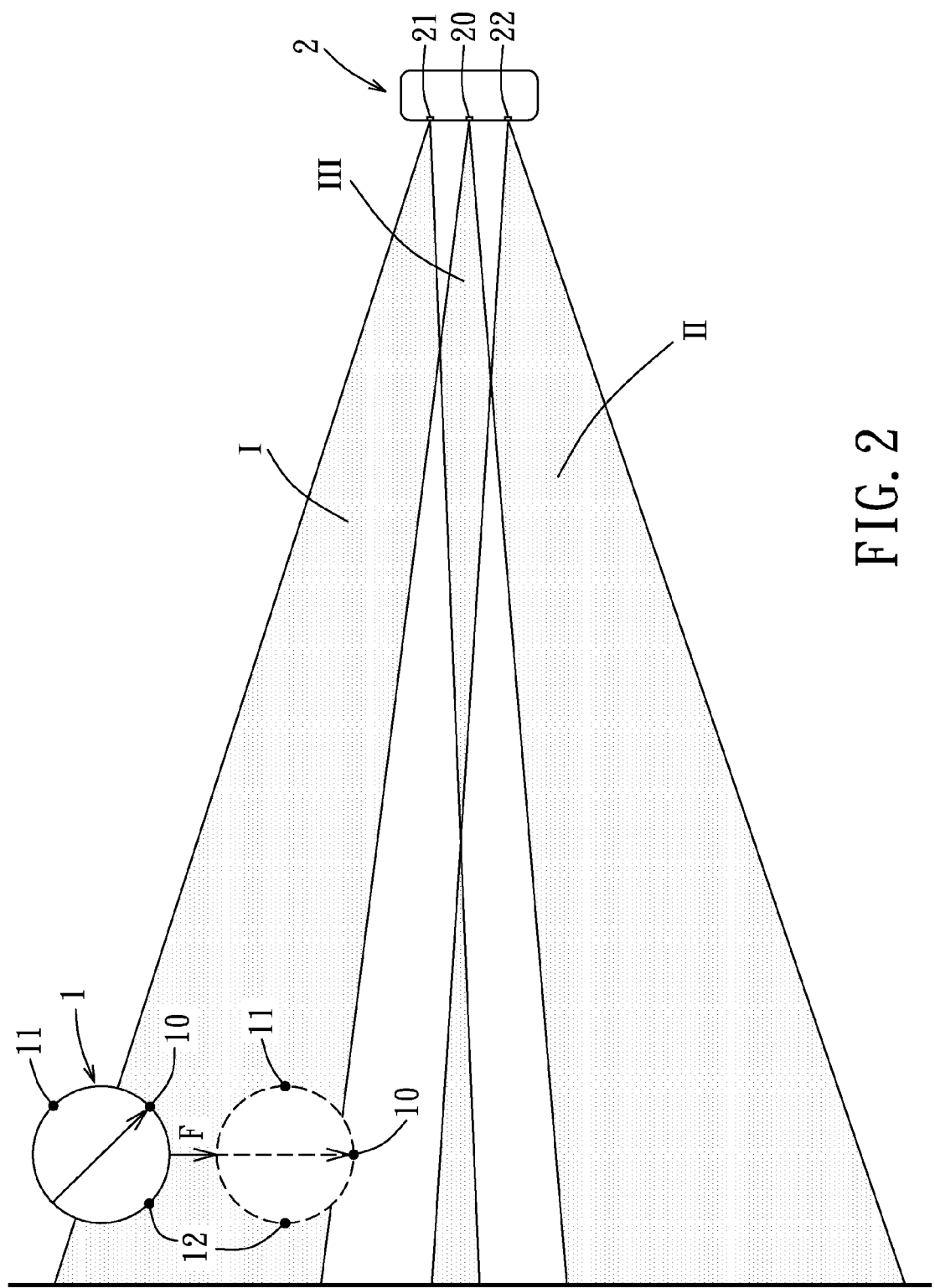
FIG. 2 is a schematic diagram illustrating three transmitters of the base station sending out respective navigating signals that cover respective areas overlapping one another.
Figure 3:
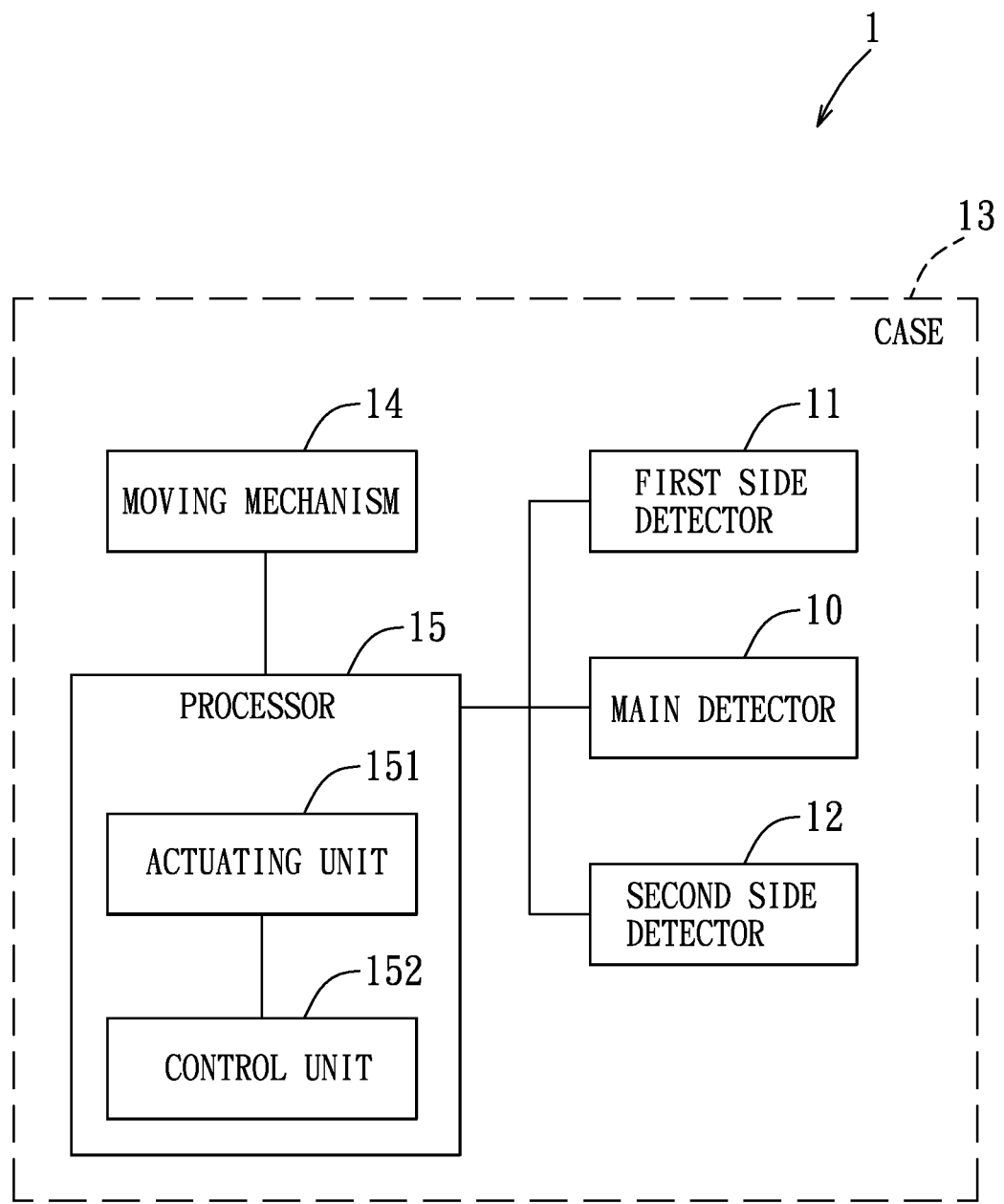
FIG. 3 is a block diagram of the autonomous mobile device of the preferred embodiment.

Referring to FIGS. 1 to 3, a preferred embodiment of a system 100 of this invention includes an autonomous mobile device 1 and a base station 2. The autonomous mobile device 1 and the base station 2 can be wiredly connected to each other when the autonomous mobile device 1 is docked on the base station 2, and can wirelessly communicate with each other when the autonomous mobile device 1 is remote from the base station 2. For example, the autonomous mobile device 1 is an autonomous robotic vacuum cleaner capable of wireless communication with the base station 2 so as to return to the base station 2, and the base station 2 is a charging dock capable of wired connection with the autonomous mobile device 1 for charging a battery of the autonomous mobile device 1.

The base station 2 includes a main transmitter 20, and first and second auxiliary transmitters 21, 22 that are disposed at opposite sides of the main transmitter 20 and that are spaced apart from the main transmitter 20. The main transmitter 20 is configured for sending out a main navigating signal covering a main area (III), the first auxiliary transmitter 21 is configured for sending out a first auxiliary navigating signal covering a first side area (I) at one of opposite sides of the main area (III), and the second auxiliary transmitter 22 is configured for sending out a second auxiliary navigating signal covering a second side area (II) at the other one of the opposite sides of the main area (III). In particular, the first side area (I), the second side area (II), and the main area (III) overlap one another.

The autonomous mobile device 1 includes a main detector 10, a first side detector 11, a second side detector 12, a movable case 13, and a moving mechanism 14 and a processor 15 that are disposed in the case 13. The main detector 10 is fixedly disposed on the case 13, and the first and second side detectors 11 and 12 are fixedly disposed on the case 13 at opposite first and second positions angularly spaced apart from the main detector 10. In particular, the case 13 has a curved side surface 131, and the main detector 10 and the first and second side detectors 11, 12 are disposed at the curved side surface 131. Preferably, the first and second side detectors 11, 12 are angularly spaced apart from the main detector 10 by 90° and −90°, respectively, such that the autonomous mobile device 1 has a detection angle exceeding 180°. The main detector 10 and the first and second side detectors 11, 12 are configured to detect the main navigating signal and the first and second auxiliary navigating signals.

It should be noted that, when the main detector 10 faces the main transmitter 20 as shown in FIG. 1, the first side detector 11 and the first auxiliary transmitter 21 are disposed at a same one of opposite sides of an imaginary line (A) through the main detector 10 and the main transmitter 20, and the second side detector 12 and the second auxiliary transmitter 22 are disposed at the other one of the opposite sides of the imaginary line (A).

The moving mechanism 14 is operable to move and rotate the case 13 in a known manner. The processor 15 is coupled to the main detector 10, the first and second side detectors 11, 12, and the moving mechanism 14, and includes an actuating unit 151 configured to initiate a method for navigating the autonomous mobile device 1 to the base station 2, and a control unit 152 coupled to the actuating unit 151 and configured to control the moving mechanism 14.

In this embodiment, as shown in FIG. 2, when one of the main detector 10, the first side detector 11 and the second side detector 12 detects the first or second auxiliary navigating signal, the autonomous mobile device 1 is operable to move into the main area (III) and then to be navigated to the base station 2 by the main navigating signal. The method for navigating the autonomous mobile device 1 to the base station 2 may include the following three conditions: one of the main detector 10, the first side detector 11 and the second side detector 12 detects the first auxiliary navigating signal (first condition); one of the main detector 10, the first side detector 11 and the second side detector detects the second auxiliary navigating signal (second condition); and one of the main detector 10, the first side detector 11 and the second side detector 12 detects the main navigating signal (third condition).

Figure 4:
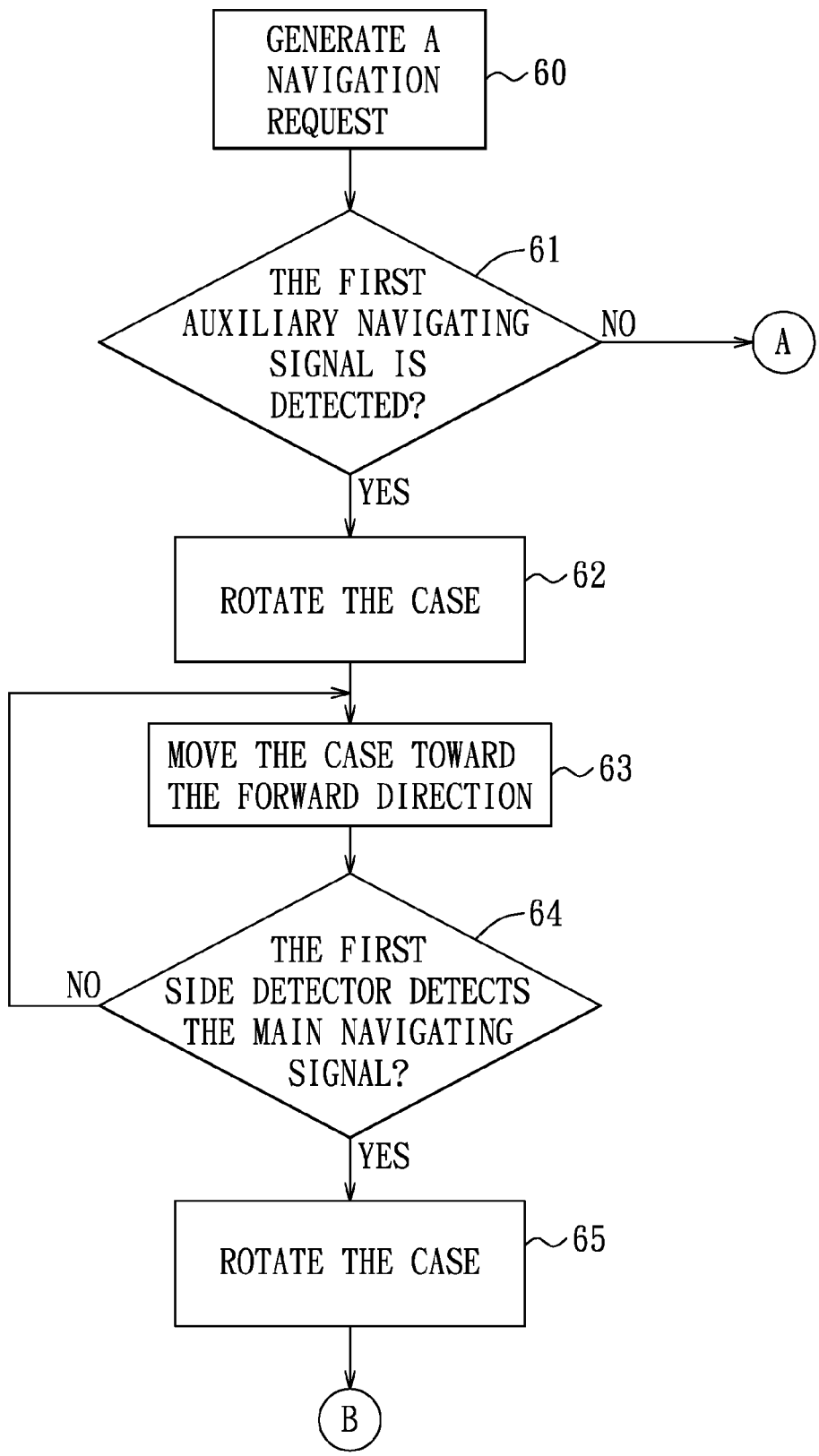
FIGS. 4 to 6 are flow charts of a method for navigating the autonomous mobile device to the base station.
Figure 5:
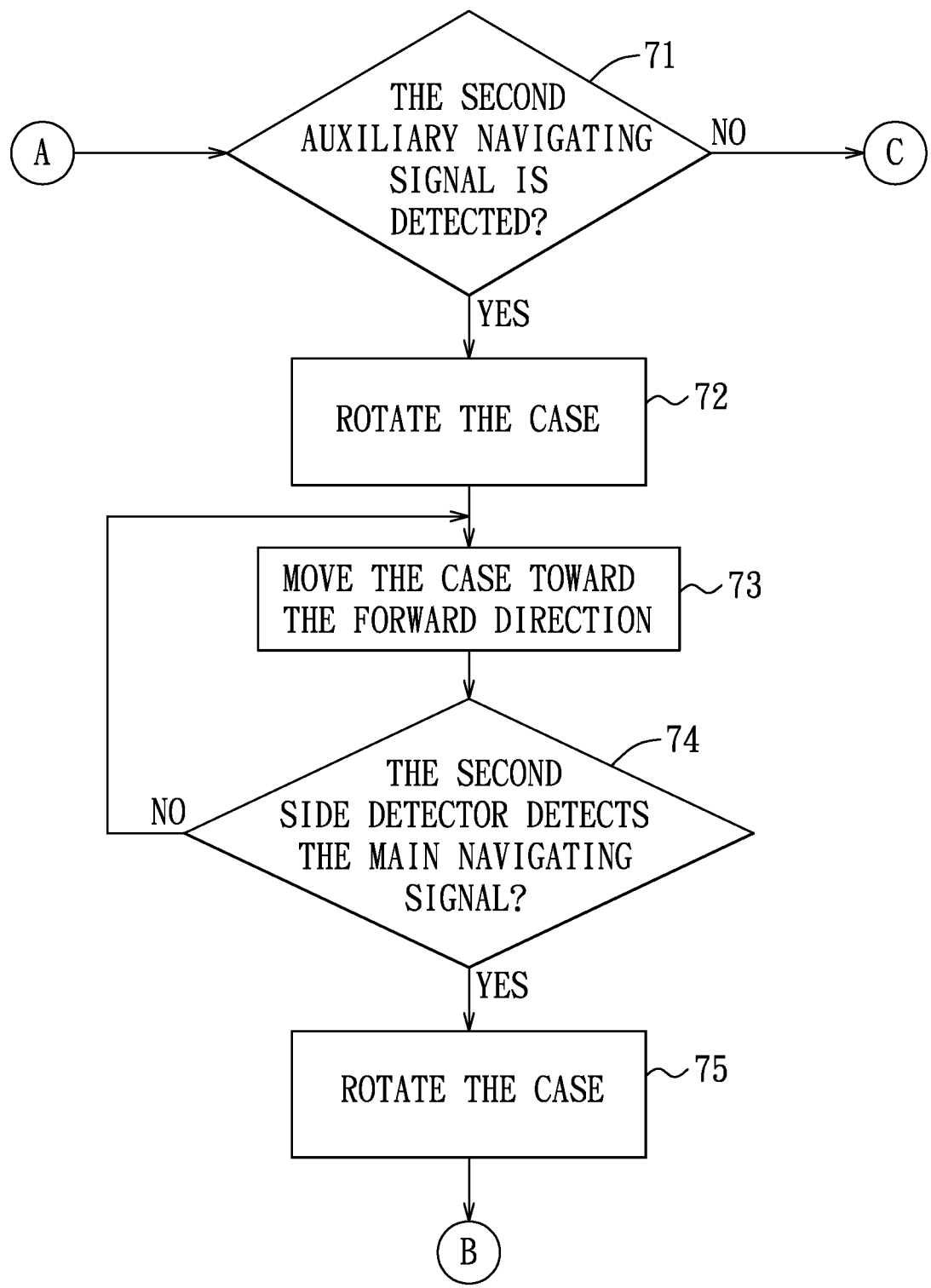
Figure 6:
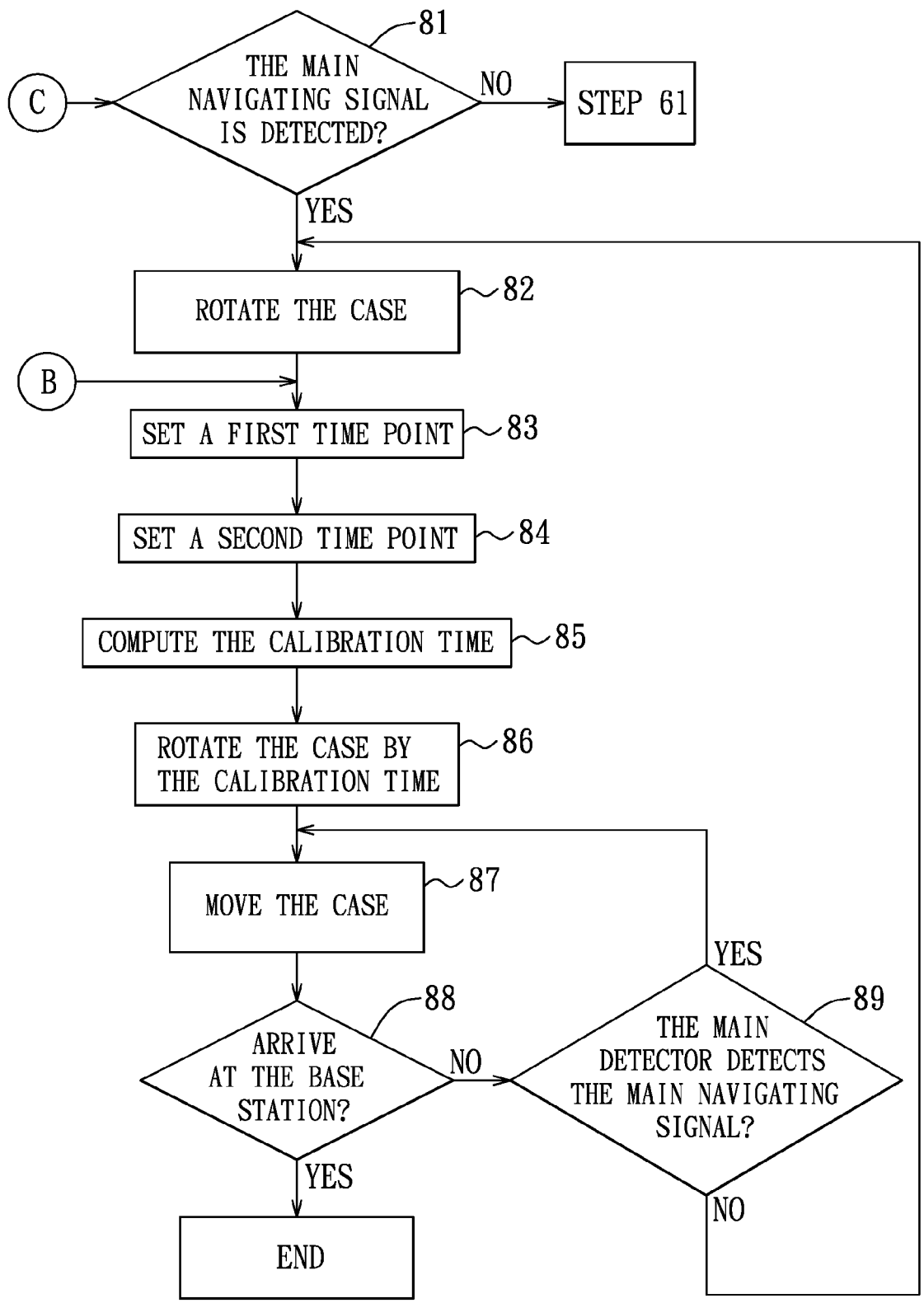

Further referring to FIGS. 4 to 6, the method for navigating the autonomous mobile device 1 to the base station 2 includes the following steps.

In step 60, the actuating unit 151 is operable to generate a navigation request according to a state and working progress of the autonomous mobile device 1, and to send the navigation request to the control unit 152. For example, the actuating unit 151 may be operable to generate the navigation request when capacity of the battery of the autonomous mobile device 1 is lower than a threshold value or when the autonomous mobile device 1 has finished cleaning a specified area.

In response to the navigation request from the actuating unit 151, the control unit 152 is operable, in step 61, to determine whether at least one of the main detector 10, the first side detector 11 and the second side detector 12 detects the first auxiliary navigating signal, i.e., the first condition. The flow goes to step 62 when the determination made in step 61 is affirmative, and goes to step 71 when otherwise.

In step 62, the control unit 152 is operable to control the moving mechanism 14 to rotate the case 13 in a clockwise direction until the first side detector 11 detects the first auxiliary navigating signal. Then, in step 63, the control unit 152 is operable to control the moving mechanism 14 to move the case 13 toward a forward direction (F) pointed by the main detector 10.

In step 64, the control unit 152 is operable to determine whether the first side detector 11 detects the main navigating signal. The flow goes to step 65 when it is determined that the first side detector 11 detects the main navigating signal, and goes back to step 63 when otherwise.

In step 65, the control unit 152 is operable to control the moving mechanism 14 to rotate the case 13 in a counterclockwise direction until the main detector 10 detects the main navigating signal. After step 65, the control unit 152 is operable to implement step 83.

Referring to FIG. 5, in step 71, the control unit 152 is operable to determine whether at least one of the main detector 10, the first side detector 11 and the second side detector 12 detects the second auxiliary navigating signal, i.e., the second condition. The flow goes to step 72 when the determination made in step 61 is affirmative, and goes to step 81 when otherwise.

In step 72, the control unit 152 is operable to control the moving mechanism 14 to rotate the case 13 in the counterclockwise direction until the second side detector 12 detects the second auxiliary navigating signal. Then, the control unit 152 is operable, in step 73, to control the moving mechanism 14 to move the case 13 toward a forward direction (F) pointed by the main detector 10.

In step 74, the control unit 152 is operable to determine whether the second side detector 12 detects the main navigating signal. The flow goes to step 75 when it is determined that the second side detector 12 detects the main navigating signal, and goes back to step 73 when otherwise.

In step 75, the control unit 152 is operable to control the moving mechanism 14 to rotate the case 13 in the clockwise direction until the main detector 10 detects the main navigating signal. After step 75, the control unit 152 is operable to implement step 83.

Referring to FIG. 6, in step 81, the control unit 152 is operable to determine whether at least one of the main detector 10, the first side detector 11 and the second side detector 12 detects the main navigating signal, i.e., the third condition. The flow goes to step 82 when the determination made in step 81 is affirmative, and goes back to step 61 when otherwise. It should be noted that, in other embodiment, the flow may go back to step 71 when it is determined in step 81 that the main navigating signal is not detected.

In step 82, the control unit 152 is operable to control the moving mechanism 14 to rotate the case 13 until the main detector 10 detects the main navigating signal. It should be noted that, in this step, the moving mechanism 14 may rotate the case 13 in an arbitrary direction, i.e., one of the clockwise direction and the counterclockwise direction.

In step 83, the control unit 152 is operable to control the moving mechanism 14 to rotate the case 13 in a first direction (i.e., one of the clockwise direction and the counterclockwise direction) until the main detector 10 fails to detect the main navigating signal. At the same time when the main detector 10 fails to detect the main navigating signal in step 83, the control unit 152 is further operable to set a first time point. Subsequently, the control unit 152 is operable, in step 84, to control the moving mechanism 14 to rotate the case 13 in a second direction opposite to the first direction (i.e., the other one of the clockwise direction and the counterclockwise direction) until the main detector 10 fails to detect the main navigating signal. At the same time when the main detector 10 fails to detect the main navigating signal in step 84, the control unit 152 is further operable to set a second time point.

In step 85, the control unit 152 is operable to compute a calibration time according to the first and second time points. In this embodiment, the control unit 152 is configured to compute the calibration time as a half value of a time difference between the first and second time points.

In step 86, the control unit 152 is operable to control the moving mechanism 14 to rotate the case 13 in the first direction by the calibration time so as to make the main detector 10 substantially point toward the base station 2. Then, the control unit 152 is operable, in step 87, to control the moving mechanism 14 to move the case 13 toward the forward direction (F) pointed by the main detector 10, and is operable, in step 88, to determine whether the autonomous mobile device 1 has arrived at the base station 2. When it is determined in step 88 that the autonomous mobile device 1 has not yet arrived at the base station 2, the flow goes to step 89.

In step 89, the control unit 152 is operable to determine whether the main detector 10 detects the main navigating signal. The flow goes back to step 87 when the determination made in step 89 is affirmative, and goes back to step 82 when otherwise.

It should be noted that, in other embodiments, the control unit 152 may not be configured to determine the first, second and third conditions in the order disclosed herein. For instance, the control unit 152 may be configured to implement step 71, after step 60, to determine whether the second auxiliary navigating signal is detected.

Figure 7:
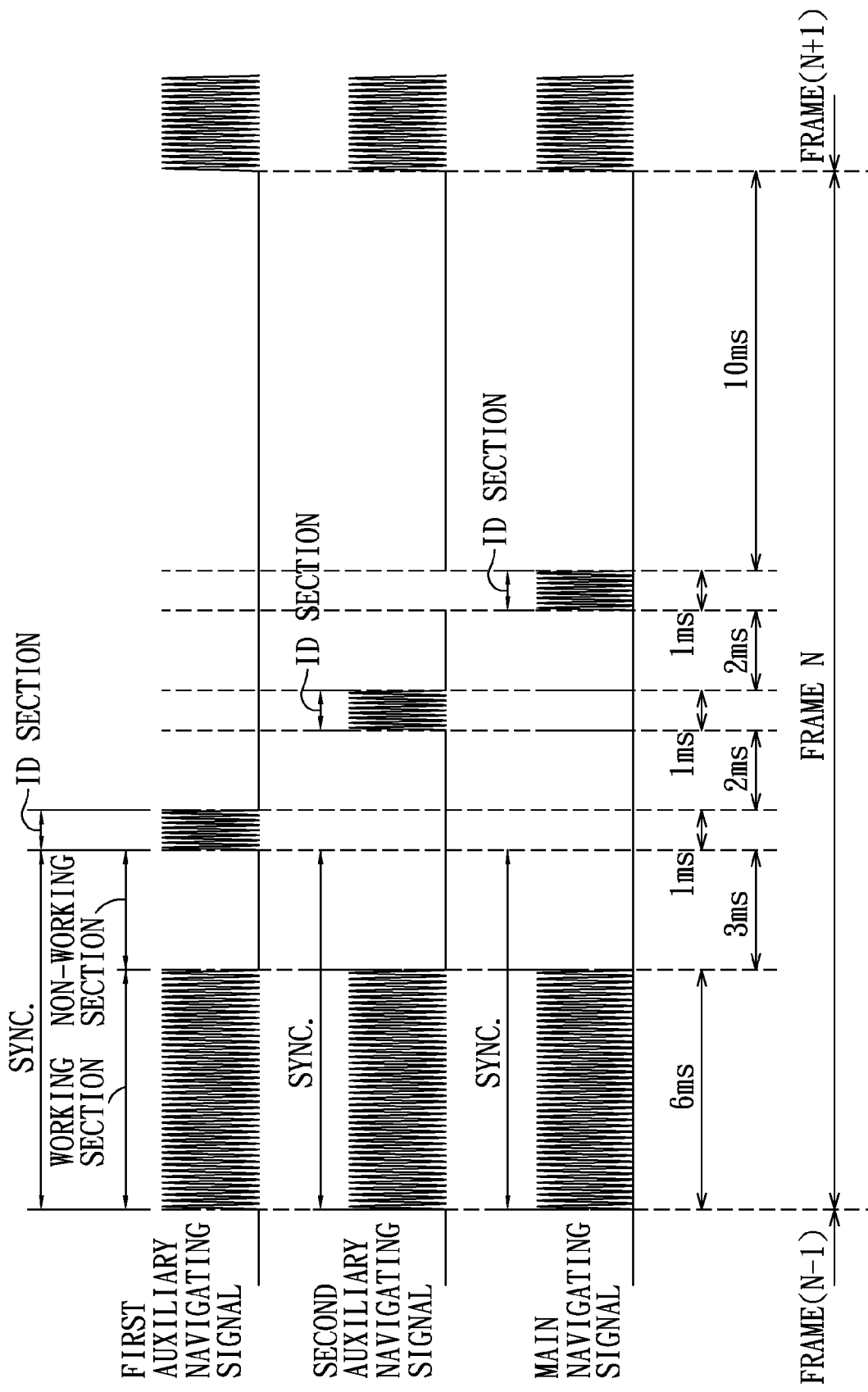
FIG. 7 is a plot illustrating mutually distinct encoding modulations of the navigating signals sent out by the transmitters of the base station.

Referring to FIG. 7, the main transmitter 20, the first auxiliary transmitter 21, and the second auxiliary transmitter 22 of the base station 2 are configured to send out the main navigating signal, the first auxiliary navigating signal, and the second auxiliary navigating signal using mutually distinct encoding modulations, respectively. Thus, the control unit 152 may be operable to determine which one of the main navigating signal, the first auxiliary navigating signal and the second auxiliary navigating signal is detected according to the respective encoding modulations. In particular, each of the main navigating signal, the first auxiliary navigating signal and the second auxiliary navigating signal is coded with a series of identical frames, each of which includes a working section, a non-working section, and an identification (ID) section. The working section and the non-working section of each of the main navigating signal, the first auxiliary navigating signal and the second auxiliary navigating signal are synchronized, that is to say, the working sections of the three navigating signals occur at the same time and are followed immediately by the non-working sections. However, an interval between the working section and the ID section is different for each of the three navigating signals. For example, the working section and the ID section may be in a form of a carrier wave having a preferred frequency of 56 KHz.

Further, regarding the arrangements of the transmitters 20, 21, 22 of the base station 2, when an interval between the main transmitter 20 and each of the first and second auxiliary transmitters 21, 22 is larger, the overlapping area among the first side area (I), the second side area (II) and the main area (III) is larger. Such an arrangement facilitates the autonomous mobile device 1 to move into the first and second side areas (I), (II) and the main area (III), that is to say, it is relatively easy for the autonomous mobile device 1 to detect the navigating signals. As a result, the efficiency of navigation of the autonomous mobile device 1 to the base station 2 may be enhanced.

To sum up, the autonomous mobile device 1 of this embodiment includes three detectors (i.e., the main detector 10, the first side detector 11, and the second side detector 12), such that the detection angle of the autonomous mobile device 1 is relatively wide and exceeds 180°. Thus, it is relatively easy for the autonomous mobile device 1 to detect the navigating signals sent out by the base station 2. Further, by executing steps 82 to 89 of the above-mentioned method several times, e.g., two or three times, the autonomous mobile device 1 can arrive at the base station 2. Accordingly, a path of the autonomous mobile device 1 returning to the base station 2 is optimized, and thus, the autonomous mobile device 1 can be navigated to the base station 2 efficiently.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for navigating an autonomous mobile device to a base station that sends out a main navigating signal, the autonomous mobile device including a movable case, a main detector disposed on the case, and a control unit for controlling movement of the case, said method comprising the following steps of:
    a) when the main detector detects the main navigating signal, configuring the control unit to rotate the case in a first direction until the main detector fails to detect the main navigating signal, and configuring the control unit to set a first time point when the main detector fails to detect the main navigating signal;
    b) configuring the control unit to rotate the case in a second direction opposite to the first direction until the main detector fails to detect the main navigating signal, and configuring the control unit to set a second time point when the main detector fails to detect the main navigating signal;
    c) configuring the control unit to compute a calibration time according to the first and second time points;
    d) configuring the control unit to rotate the case in the first direction by the calibration time so as to make the main detector substantially point toward the base station; and
    e) configuring the control unit to move the case toward a direction pointed by the main detector.

2. The method as claimed in claim 1, further comprising, after step e), the steps of:
    configuring the control unit to determine whether the main detector detects the main navigating signal;
    when it is determined that the main detector does not detect the main navigating signal, configuring the control unit to rotate the case until the main detector detects the main navigating signal; and
    configuring the control unit to repeat step a) to c).

3. The method as claimed in claim 1, the autonomous mobile device further including a pair of side detectors fixedly disposed on the case at opposite positions angularly spaced apart from the main detector, said method further comprising, before step a), the steps of:
    configuring the control unit to determine whether at least one of the main detector and the side detectors detects the main navigating signal; and
    configuring the control unit to rotate the case until the main detector detects the main navigating signal.

4. The method as claimed in claim 1, the autonomous mobile device further including a first side detector disposed on the case at a first position angularly spaced apart from the main detector, the base station including a main transmitter sending out the main navigating signal that covers a main area and a first auxiliary transmitter sending out a first auxiliary navigating signal that covers a first side area at one of opposite sides of the main area, the first side detector and the first auxiliary transmitter being disposed at a same one of opposite sides of an imaginary line through the main detector and the main transmitter when the main detector faces the main transmitter, wherein said method further comprises, before step a), the steps of:

configuring the control unit to determine whether at least one of the main detector and the first side detector detects the first auxiliary navigating signal;

when it is determined that at least one of the main detector and the first side detector detects the first navigating signal, configuring the control unit to rotate the case until the first side detector detects the first auxiliary navigating signal;

configuring the control unit to move the case toward the direction pointed by the main detector until the first side detector detects the main navigating signal; and configuring the control unit to rotate the case until the main detector detects the main navigating signal.

5. The method as claimed in claim 4, the autonomous mobile device further including a second side detector disposed on the case at a second position opposite to the first side detector with respect to the main detector and angularly spaced apart from the main detector, the base station further including a second auxiliary transmitter sending out a second auxiliary navigating signal that covers a second side area at the other one of the opposite sides of the main area, the second side detector and the second auxiliary transmitter being disposed at the other one of the opposite sides of the imaginary line when the main detector faces the main transmitter, wherein said method further comprises, before step a), the steps of:

configuring the control unit to determine whether at least one of the main detector, the first side detector and the second side detector detects the second auxiliary navigating signal;

when it is determined that at least one of the main detector, the first side detector and the second side detector detects the second navigating signal, configuring the control unit to rotate the case until the second side detector detects the second auxiliary navigating signal;

configuring the control unit to move the case toward the direction pointed by the main detector until the second side detector detects the main navigating signal; and configuring the control unit to rotate the case until the main detector detects the main navigating signal.

6. The method as claimed in claim 5, the main navigating signal, the first auxiliary navigating signal and the second auxiliary navigating signal being coded using mutually distinct encoding modulations, wherein the control unit is configured to determine which one of the main navigating signal, the first auxiliary navigating signal and the second auxiliary navigating signal is detected according to the respective encoding modulations.

7. The method as claimed in claim 1, wherein, in step c), the control unit is configured to compute the calibration time as a half value of a time difference between the first and second time points.

8. An autonomous mobile device capable of docking on a base station that sends out a main navigating signal, said autonomous mobile device comprising:

a movable case;

a main detector disposed on said case; and a control unit for controlling movement of said case, and operable to implement a method for navigating said autonomous mobile device to the base station, the method including the following steps of i) when said main detector detects the main navigating signal, rotating said case in a first direction until said main detector fails to detect the main navigating signal, and setting a first time point when said main detector fails to detect the main navigating signal, ii) rotating said case in a second direction opposite to the first direction until the main detector fails to detect the main navigating signal, and setting a second time point when said main detector fails to detect the main navigating signal, iii) computing a calibration time according to the first and second time points, iv) rotating said case in the first direction by the calibration time so as to make said main detector substantially point toward the base station, and v) moving said case toward a direction pointed by said main detector.

9. The autonomous mobile device as claimed in claim 8, wherein said control unit is further operable, after step v), to:

determine whether said main detector detects the main navigating signal;

when it is determined that said main detector does not detect the main navigating signal, rotate said case until said main detector detects the main navigating signal; and repeat step i) to v).

10. The autonomous mobile device as claimed in claim 8, further comprising a pair of side detectors fixedly disposed on said case at opposite positions angularly spaced apart from said main detector, wherein said control unit is further operable, before step i), to:

determine whether at least one of said main detector and said side detectors detects the main navigating signal; and rotate the case until the main detector detects the main navigating signal.

11. The autonomous mobile device as claimed in claim 8, the base station including a main transmitter sending out the main navigating signal that covers a main area, and a first auxiliary transmitter sending out a first auxiliary navigating signal that covers a first side area at one of opposite sides of the main area, wherein said autonomous mobile device further comprises a first side detector disposed on said case at a first position angularly spaced apart from said main detector, said first side detector and the first auxiliary transmitter to be disposed at a same one of opposite sides of an imaginary line through said main detector and the main transmitter when said main detector faces the main transmitter, wherein said control unit is further operable, before step i), to determine whether at least one of said main detector and said first side detector detects the first auxiliary navigating signal, when it is determined that at least one of said main detector and said first side detector detects the first navigating signal, rotate said case until said first side detector detects the first auxiliary navigating signal, move said case toward the direction pointed by said main detector until said first side detector detects the main navigating signal, and rotate said case until said main detector detects the main navigating signal.

12. The autonomous mobile device as claimed in claim 11, the base station further including a second auxiliary transmitter sending out a second auxiliary navigating signal that covers a second side area at the other one of the opposite sides of the main area, wherein said autonomous mobile device further comprises a second side detector disposed on said case at a second position opposite to said first side detector with respect to said main detector and angularly spaced apart from said main detector, said second side detector and the second auxiliary transmitter to be disposed at the other one of the opposite sides of the imaginary line when said main detector faces the main transmitter, wherein said control unit is further operable, before step i), to:

determine whether at least one of said main detector, said first side detector and said second side detector detects the second auxiliary navigating signal, when it is determined that at least one of said main detector, said first side detector and said second side detector detects the second navigating signal, rotate said case until said second side detector detects the second auxiliary navigating signal, move said case toward the direction pointed by said main detector until said second side detector detects the main navigating signal, and rotate said case until said main detector detects the main navigating signal.

13. The autonomous mobile device as claimed in claim 12, the main navigating signal, the first auxiliary navigating signal and the second auxiliary navigating signal being coded using mutually distinct encoding modulations, wherein said control unit is operable to determine which one of the main navigating signal, the first auxiliary navigating signal and the second auxiliary navigating signal is detected according to the respective encoding modulations.

14. The autonomous mobile device as claimed in claim 8, wherein said control unit is operable to compute the calibration time as a half value of a time difference between the first and second time points.

15. A system comprising:

a base station for sending out a main navigating signal; and an autonomous mobile device capable of docking on said base station, and including a movable case, a main detector disposed on said case, and a control unit for controlling movement of said case, and operable to implement a method for navigating said autonomous mobile device to said base station, the method including the following steps of A) when said main detector detects the main navigating signal, rotating said case in a first direction until said main detector fails to detect the main navigating signal, and setting a first time point when said main detector fails to detect the main navigating signal, B) rotating said case in a second direction opposite to the first direction until the main detector fails to detect the main navigating signal, and setting a second time point when said main detector fails to detect the main navigating signal, C) computing a calibration time according to the first and second time points, D) rotating said case in the first direction by the calibration time so as to make said main detector substantially point toward said base station, and E) moving said case toward a direction pointed by said main detector.

* * * * *